United States Patent
Falk

(10) Patent No.: US 7,755,535 B2
(45) Date of Patent: Jul. 13, 2010

(54) RADAR SYSTEM COMPRISING AT LEAST TWO SPATIALLY SEPARATED ANTENNA UNITS

(75) Inventor: Kent Falk, Göteborg (SE)

(73) Assignee: Telefonaktiebolaget LM Ericsson (Pub), Stockholm (SE)

( * ) Notice: Subject to any disclaimer, the term of this patent is extended or adjusted under 35 U.S.C. 154(b) by 35 days.

(21) Appl. No.: 12/278,436

(22) PCT Filed: Feb. 9, 2006

(86) PCT No.: PCT/SE2006/000175

§ 371 (c)(1),
(2), (4) Date: Aug. 6, 2008

(87) PCT Pub. No.: WO2007/091929

PCT Pub. Date: Aug. 16, 2007

(65) Prior Publication Data

US 2009/0027256 A1    Jan. 29, 2009

(51) Int. Cl.
*G01S 13/58* (2006.01)
(52) U.S. Cl. .................. 342/107; 342/111; 342/140; 342/189
(58) Field of Classification Search .............. 342/107
See application file for complete search history.

(56) References Cited

U.S. PATENT DOCUMENTS

| 4,743,906 | A |   | 5/1988 | Fullerton |
|---|---|---|---|---|
| 4,994,809 | A | * | 2/1991 | Yung et al. ............ 342/108 |
| 5,252,980 | A | * | 10/1993 | Gray et al. ............ 342/59 |
| 5,646,623 | A | * | 7/1997 | Walters et al. .......... 342/129 |
| 7,430,257 | B1 | * | 9/2008 | Shattil .................. 375/347 |
| 2005/0057395 | A1 |   | 3/2005 | Atkinson et al. |

* cited by examiner

*Primary Examiner*—Thomas H Tarcza
*Assistant Examiner*—Timothy A Brainard
(74) *Attorney, Agent, or Firm*—Michael G. Cameron

(57) ABSTRACT

A radar system comprising at least two spatially separated antenna units, each comprising one antenna. Each antenna unit comprising a signal generator connected to an antenna constitutes a transmitting antenna unit, and each antenna comprising a receiver connected to an antenna constitutes a receiving antenna. At least one receiving antenna unit is arranged for receiving at least one reflected signal, comprising signals transmitted from at least one transmitting antenna unit, having been reflected from at least one object, where the number of antenna units exceeds two. A processing unit is arranged to perform a correlation calculation, comparing at least one received signal with a set of mathematically manipulated copies. From said set, there is only one match for each reflected signal. The present invention also relates to corresponding methods.

20 Claims, 5 Drawing Sheets

RADAR SYSTEM COMPRISING AT LEAST TWO SPATIALLY SEPARATED ANTENNA UNITS

TECHNICAL FIELD

The present invention relates to a radar system comprising at least two spatially separated antenna units, wherein each antenna unit comprises one antenna, wherein at least two of the antenna units each comprises a signal generator connected to an antenna so as to constitute transmitting antenna units, and wherein at least one of the antenna units comprises a receiver connected to an antenna so as to constitute at least one receiving antenna unit, said receiving antenna unit being arranged for receiving at least one reflected signal, comprising signals generated by said signal generators and transmitted by the transmitting antenna units, having been reflected from at least one object.

The present invention also relates to another radar system comprising at least two antenna units, wherein each antenna unit comprises one antenna, wherein at least two of the antenna units comprise a receiver connected to an antenna so as to constitute receiving antenna units, and wherein at least one of the antenna units comprises a signal generator connected to an antenna so as to constitute a transmitting antenna unit, said at least two receiving antenna units being arranged for receiving at least one reflected signal, comprising at least one signal generated by said signal generator and transmitted by said transmitting antenna unit, having been reflected from at least one object.

The present invention also relates to two methods for determining at least one of: distance, radial velocity and azimuth bearing, to at least one object, using a radar system.

BACKGROUND ART

Radar is widely used for determining positions of objects relative to an observer. These objects may be immobile or moving. Radar works by emitting microwave radiation in those directions where said objects are positioned, and detecting the reflected radiation from those objects. In order words, a radar first sends microwave radiation, and then receives the reflections of said microwave radiation, when these are reflected by various objects. By analyzing these reflections, it is possible to determine the positions and radial velocity of the objects.

In order to cover a wide azimuth sector, preferably 360°, rotating turntables carrying a transmitting antenna are used. These turntables are, however, quite heavy, expensive and require maintenance. Furthermore, these antennas will only cover a certain angular direction for a fraction of the available time.

Another approach is to use array antennas with a plurality of antenna elements. By feeding the antenna elements with certain phases and amplitudes, the array antenna's radiation lobe may be electrically controlled. These array antennas are usually called phased array antennas. Phased array antennas are, however, expensive and require a large number of receivers and, in some configurations, a large number of signal generators.

Therefore, there exists a need for an inexpensive radar system without moving parts which covers 360° in azimuth and comprises inexpensive and easily handled parts.

DISCLOSURE OF THE INVENTION

The objective problem that is solved by the present invention is to provide radar systems and methods for an inexpensive and versatile radar system without any moving parts.

This objective problem is solved by means of a radar system as mentioned in the introduction. The radar system is characterized in that said transmitting antenna units and said receiving antenna unit are connected to a processing unit arranged to perform a correlation calculation, comparing at least one received signal, fed from said receiving antenna unit, with a set of superimposed combinations of delayed and contracted or elongated copies of the signals generated by said signal generators, where only one certain combination corresponds to said reflected signal, where the processing unit is arranged to calculate said set of combinations with the signals generated by said signal generators as input, and where information about said object is calculated using said corresponding combination for each reflected signal.

This objective problem is also solved by means of another radar system as mentioned in the introduction. This radar system is characterized in that said receiving antenna units and said transmitting antenna unit are connected to a processing unit arranged to perform a correlation calculation, comparing the signals fed from the receiving antenna units with a set of delayed and contracted or elongated copies of said signal generated by said signal generator, where only one delayed and contracted or elongated copy corresponds to said reflected signal, where the processing unit is arranged to calculate the set of delayed and contracted or elongated copies with said signal generated by said signal generator as input, and where information about the at least one object is calculated using said corresponding delayed and contracted or elongated copy for each reflected signal.

This objective problem is also solved by means of two methods as mentioned in the introduction.

The first method is characterized in that it comprises the steps: generating and transmitting at least two signals, which signals essentially are mutually uncorrelated, using at least two corresponding transmitting antennas with a certain spatial separation; feeding said at least two generated signals to a processing unit; receiving at least one signal reflected from said object using at least one receiving antenna; feeding said received signal to the processing unit; performing a correlation calculation for the generated and received signals fed to the processing unit; and determining at least one of: distance, radial velocity and azimuth bearing to said object, using the result from the correlation calculation.

The second method is characterized in that it comprises the steps: generating and transmitting at least one essentially non-repetitive signal using at least one corresponding transmitting antenna; feeding said generated signal to a processing unit; receiving at least one signal reflected from said object using at least two receiving antennas having a certain spatial separation, resulting in two received signals; feeding said received signals to the processing unit; performing a correlation calculation for the generated and received signals fed to the processing unit; and determining at least one of: distance, radial velocity and azimuth bearing to said object, using the result from the correlation calculation.

Preferred embodiments are disclosed in the dependent claims.

Several advantages are achieved by means of the present invention, for example:
- Inexpensive parts
- Few antennas
- Few receivers
- Few signal generators
- No moving parts
- Omni-directional coverage
- Integration time is only limited by the kinematics of the target
- The side lobes are essentially eliminated
- Simple antenna construction, no densely packed phased array antennas or similar are required
- Range ambiguities are decreased

BRIEF DESCRIPTION OF THE DRAWINGS

The present invention will now be described more in detail with reference to the appended drawing, where.

PREFERRED EMBODIMENTS

Figure 1:
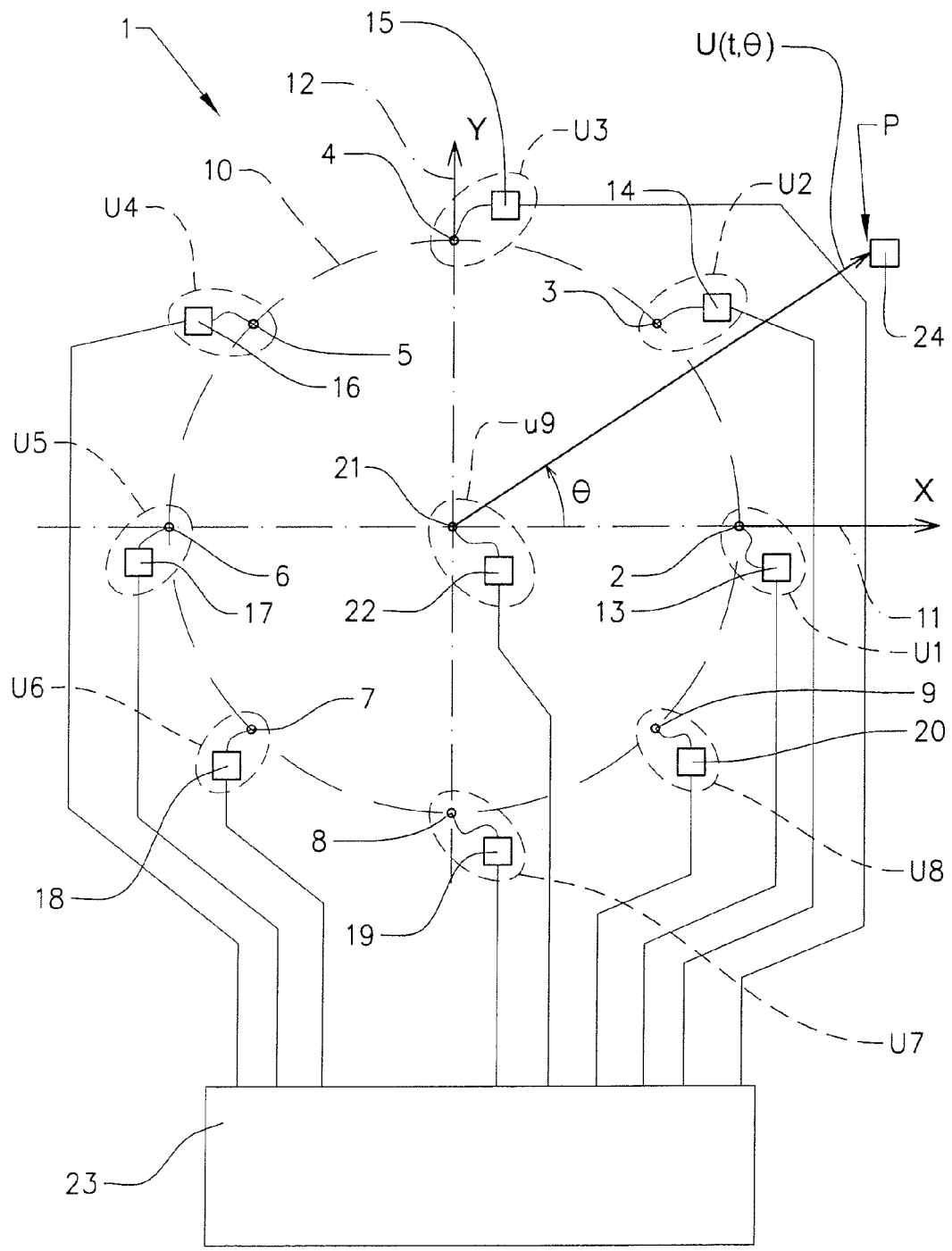
FIG. 1 shows a top view of a first embodiment.

With reference to FIG. 1, a first embodiment of a radar system 1 according to the present invention is shown in a top view. A first transmitting antenna 2, a second transmitting antenna 3, a third transmitting antenna 4, a fourth transmitting antenna 5, a fifth transmitting antenna 6, a sixth transmitting antenna 7, a seventh transmitting antenna 8, and an eighth transmitting antenna 9 is positioned essentially at the circumference of a circle 10 having a diameter D. For explanatory reasons, an x-axis 11, running through the first antenna 2 and the fifth antenna 6, and an y-axis 12, running through the third antenna 4 and the seventh antenna 8, are drawn in FIG. 1.

Each transmitting antenna 2, 3, 4, 5, 6, 7, 8, 9 is connected to a corresponding signal generator 13, 14, 15, 16, 17, 18, 19, 20. Essentially in the middle of the circle 10, a receiving antenna 21 is positioned, where the distance between the receiving antenna 21 and each one of the transmitting antennas 2, 3, 4, 5, 6, 7, 8, 9 essentially is the distance ½ D, i.e. the radius of the circle 10.

The transmitting antennas 2, 3, 4, 5, 6, 7, 8, 9 are positioned essentially equidistantly with respect to each other, several wavelengths apart, typically with a separation of 0.7·λ/desired beamwidth (in radians), where the wavelength λ corresponds to the centre frequency in the frequency band used.

The receiving antenna 21 is connected to a receiver 22, which in turn is connected to a computer 23 for performing computations on the received signals. The signal generators 13, 14, 15, 16, 17, 18, 19, 20 are also connected to the computer 23.

Each antenna 2, 3, 4, 5, 6, 7, 8, 9, 21 and its corresponding signal generator 13, 14, 15, 16, 17, 18, 19, 20, or receiver 22, constitute an antenna unit U1, U2, U2, U4, U5, U6, U7, U8, U9. In particular, each transmitting antenna 2, 3, 4, 5, 6, 7, 8, 9 and its corresponding signal generator 13, 14, 15, 16, 17, 18, 19, 20 constitute a corresponding transmitting antenna unit U1, U2, U2, U4, U5, U6, U7, U8, and the receiving antenna 21 and its receiver 22 constitute a receiving antenna unit U9.

According to the first embodiment, each one of the signal generators 13, 14, 15, 16, 17, 18, 19, 20 generates signals which essentially are mutually uncorrelated. For one example of such signals, the signal generators 13, 14, 15, 16, 17, 18, 19, 20 ideally all generate white noise. Other examples of uncorrelated signals are so-called Hermits functions and all known orthonormal so-called wavelet bases.

In the following, it is assumed that white noise is used. In reality, such a random signal is always limited by a certain bandwidth.

The generated signals are radiated by the respective antennas 2, 3, 4, 5, 6, 7, 8, 9, and also fed back to the computer 23, where the computer 23 thus receives information regarding which signals that have been radiated. The transmitting antennas 2, 3, 4, 5, 6, 7, 8, 9 and the receiving antenna 21 are preferably omni-directional, for example they are in the form of wire antennas. Here, the meaning of wire antennas is cylindrical dipoles or monopoles.

Such a random signal contains a large number of frequencies, in the ideal case with white noise, the signal contains an infinite number of frequencies.

The transmitted signals are superimposed in space with different time delays after they have been radiated. Each point in space corresponds to a unique set of time delays, and a unique signal occurs in each direction due to the superposition. At a certain point P, a first object 24 is positioned, reflecting the signal at that point. At this point P, the signal is a combination of the radiated signals with different time delays. The reflected signal from the point P also has this combination, and is received by the receiving antenna 21 and fed to the computer 23. Due to Doppler effect, the reflected signal is contracted if the object 24 is approaching, elongated if the object 24 is moving away, and neither if the object is immobile relative to the transmitting antennas 2, 3, 4, 5, 6, 7, 8, 9.

According to the present invention, the computer 23 performs a correlation procedure, comparing the received signal with a set of superimposed combinations of delayed and contracted/elongated copies of the transmitted signals, where only one certain signal combination corresponds to the reflected one. The set of possible signal combinations is calculated using all the generated signals as input, where each calculated possible signal combination in the set corresponds to a certain point P in space. The more possible signal combinations that are calculated, the greater volume coverage is achieved.

The calculated correlations are measures of a probability—the higher value a certain calculated correlation has, the higher is the probability that the a certain signal configuration corresponds to the reflected one. The correlations which have a relatively high value form so-called correlation peaks.

Figure 2:
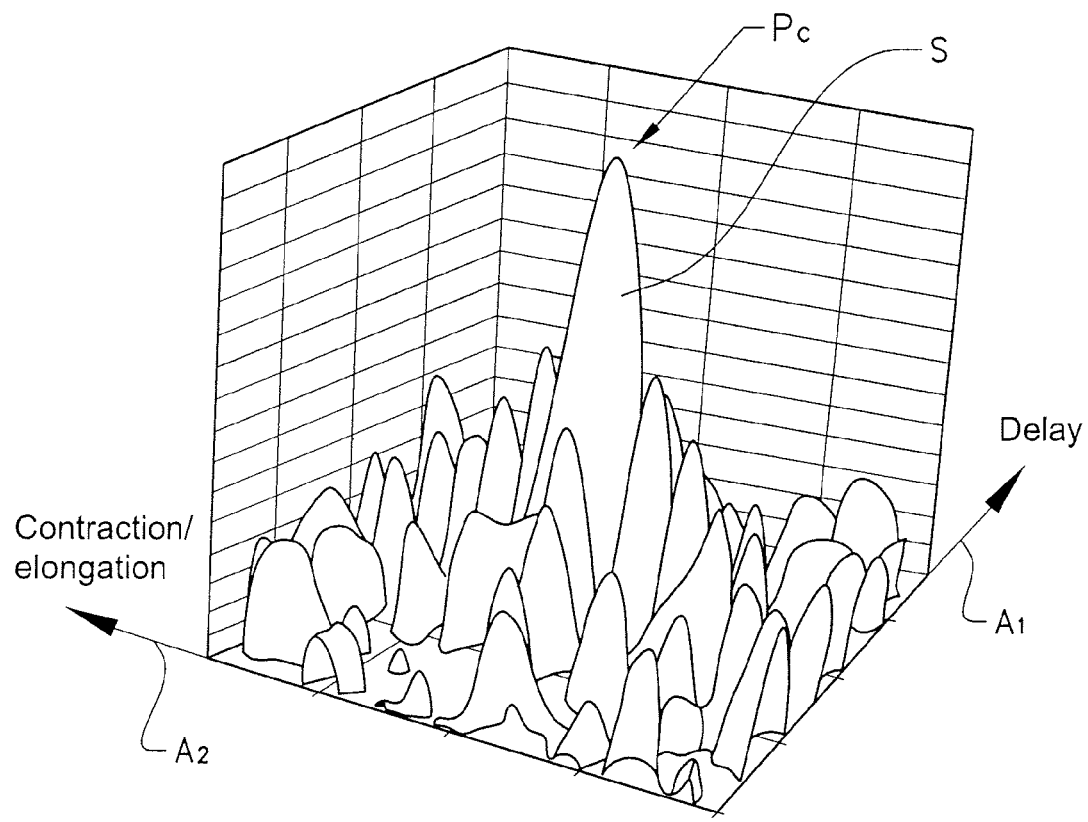
FIG. 2 shows a correlation surface.

The most preferred practical implementation of the invention as shown in FIG. 2 is to use the position of the correlation peaks on a correlation surface S with delay on a first axis A1 and contraction/elongation on a second axis A2 to measure the range and radial velocity of the reflection. The combination of delayed transmitted signals that results in the maximum correlation peak for each reflection can by simple calculations, with knowledge of the geometry of the antenna configuration, be transformed to the direction of that specific reflection. Of course, the radar system 1 according to the present invention may be used to detect a plurality of objects via a plurality of reflections. In FIG. 2, however, only one correlation peak $P_c$ is shown.

This type of receiver 22 is normally called a correlation receiver.

In FIG. 1, a certain transmitted signal $u(t, \theta)$ is indicated with an arrow. Said signal $u(t, \theta)$ is dependent on time t and an azimuth angle $\theta$ between a certain azimuth line, in this example the x-axis, and the direction of the signal.

For the first embodiment, the transmitted signal $u(t, \theta)$ may ideally be written as:

$$u(t, \theta) = \sum_{n=0}^{N-1} s_n\left(t + \frac{D}{2 \cdot c_0} \cdot \cos\left(\theta + n \cdot \frac{2 \cdot \pi}{N}\right)\right) \quad (1)$$

In the equation (1) above, the number of transmitting antennas is general and indicated with N. In our example with reference to FIG. 1, the number N of transmitting antennas 2, 3, 4, 5, 6, 7, 8, 9 equals 8. $c_0$ is the speed of light in vacuum.

In the following, a target bearing angle $\theta$ and assumed bearing angle $\theta_s$ is defined. The correlation result $R(\theta, \theta_s)$ has, under noise free conditions, a global maximum when $\theta$ equals $\theta_s$. Such a correlation result $R(\theta, \theta_s)$ as a function of target bearing angle $\theta$ and assumed bearing angle $\theta_s$ may be written as:

$$R(\theta, \theta_s) = \frac{1}{T} \cdot \int_{-\frac{T}{2}}^{\frac{T}{2}} \sum_{n=0}^{N-1} s_n\left(t + \frac{D}{2 \cdot c_0} \cdot \cos\left(\theta + n \cdot \frac{2 \cdot \pi}{N}\right)\right) \cdot \quad (2)$$

$$\sum_{m=0}^{N-1} s_m^*\left(t + \frac{D}{2 \cdot c_0} \cdot \cos\left(\theta_s + m \cdot \frac{2 \cdot \pi}{N}\right)\right) \cdot dt =$$

$$\frac{1}{T} \cdot \sum_{n=0}^{N-1} \sum_{m=0}^{N-1} \int_{-\frac{T}{2}}^{\frac{T}{2}} s_n\left(t + \frac{D}{2 \cdot c_0} \cdot \cos\left(\theta + n \cdot \frac{2 \cdot \pi}{N}\right)\right) \cdot$$

$$s_m^*\left(t + \frac{D}{2 \cdot c_0} \cdot \cos\left(\theta_s + m \cdot \frac{2 \cdot \pi}{N}\right)\right) \cdot dt$$

In the last equation (2), T stands for correlation time, $s_n$ stands for the signal from the element n, and * means that it is a complex conjugate. This equation can be simplified if the correlation time increases to infinity and if all signals are uncorrelated, i.e. $r_{n,m}(t) \equiv 0$ if $n \neq m$.

$$R_\infty(\theta, \theta_s) = \sum_{n=0}^{N-1} r_{n,n}\left[\frac{D}{2 \cdot c_0} \cdot \left(\cos\left(\theta_s + n \cdot \frac{2 \cdot \pi}{N}\right) - \cos\left(\theta + n \cdot \frac{2 \cdot \pi}{N}\right)\right)\right] \quad (3)$$

where $r_{n,n}(t)$ is the autocorrelation of signal number n. Assume white bandwidth limited noise with bandwidth B and centre frequency fc, with $r_{n,n}(t)$ according to:

$$r_{n,n} = \sigma^2 \cdot \cos(2 \cdot \pi \cdot f_c \cdot t) \cdot \frac{\sin\left(2 \cdot \pi \cdot B \cdot \frac{t}{2}\right)}{2 \cdot \pi \cdot B \cdot \frac{t}{2}} \quad (4)$$

The correlation result $R(\theta, \theta_s)$ with white bandwidth limited noise as a function of bearing angle $\theta$ in the correlation channel corresponding to the bearing $\theta_s$ may be written as:

$$R_\infty(\theta, \theta_s) = \quad (5)$$

$$\sum_{n=0}^{N-1} \sigma^2 \cdot \cos\left(\frac{\pi \cdot f_c \cdot D}{c_0} \cdot \left(\cos\left(\theta_s + n \cdot \frac{2 \cdot \pi}{N}\right) - \cos\left(\theta + n \cdot \frac{2 \cdot \pi}{N}\right)\right)\right) \cdot$$

-continued $$\frac{\sin\left(\frac{\pi \cdot B \cdot D}{2 \cdot c_0} \cdot \left(\cos\left(\theta_s + n \cdot \frac{2 \cdot \pi}{N}\right) - \cos\left(\theta + n \cdot \frac{2 \cdot \pi}{N}\right)\right)\right)}{\frac{\pi \cdot B \cdot D}{2 \cdot c_0} \cdot \left(\cos\left(\theta_s + n \cdot \frac{2 \cdot \pi}{N}\right) - \cos\left(\theta + n \cdot \frac{2 \cdot \pi}{N}\right)\right)}$$

It shall be noted that the calculations in the equations (1)-(5) above refer to an embodiment where all transmitting antennas are placed on the circumference of a circle, for example as shown in FIG. 1.

Generally, equation (1) may be written as $$u(t, \theta) = \sum_{n=0}^{N-1} s_n(t + \tau_n(\theta)) \quad (6)$$

where the function $\tau_n(\theta)$ depends on the geometry of the antennas. When a circular geometry is used, as in the first embodiment, the function $\tau_n(\theta)$ becomes:

$$\tau_n(\theta) = \frac{D}{2 \cdot c_0} \cdot \cos\left(\theta + n \cdot \frac{2 \cdot \pi}{N}\right) \quad (7)$$

For a geometry where a linear antenna array is used, i.e. the antennas are placed on a line, the function $\tau_n(\theta)$ becomes:

$$\tau_n(\theta) = \frac{n}{N-1} \cdot \frac{L}{c_0} \cdot \sin(\theta) \quad (8)$$

Then, when a linear antenna array is used, equation (1) becomes:

$$u(t, \theta) = \sum_{n=0}^{N-1} s_n\left(t + \frac{n}{N-1} \cdot \frac{L}{c_0} \cdot \sin(\theta)\right) \quad (9)$$

Figure 3:
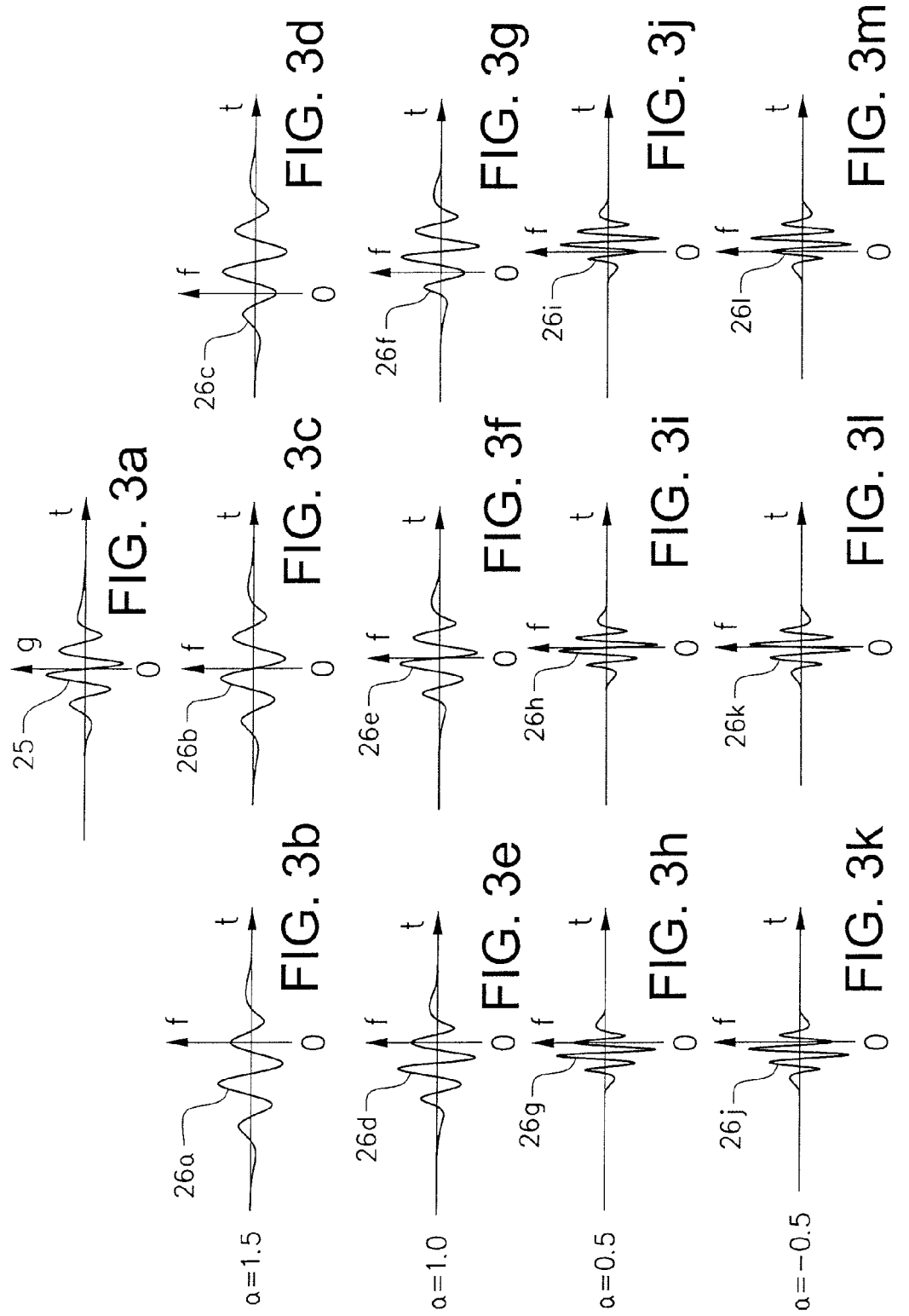
FIG. 3a shows a mother wavelet.
FIG. 3b-3m show daughter wavelets.

Preferably, the general transmitted and received signals may be defined as so-called wavelet functions. Wavelets are a class of a functions used to localize a given function in both space and scaling. A family of wavelets can be constructed from a function g(t), sometimes known as a mother wavelet. A mother wavelet g(t) as a function of time on a horizontal axis, as shown in FIG. 3a, is oscillating, i.e. both positive and negative, and reaches zero at its ends. So-called daughter wavelets $g_{a,b}(t)$ are then formed by translation b and contraction/elongation a. In our case, the translation b is in time (range), and the contraction/elongation a is radial velocity.

An individual daughter wavelet can be defined by $$f_{a,b}(t) = \frac{1}{\sqrt{a}} \cdot g\left(\frac{t-b}{a}\right) \quad (10)$$

where the term $1/\sqrt{a}$ is a power normalizing factor. In the FIGS. 3b-3m, daughter wavelets 26a, 26b, 26c, 26d, 26e, 26f, 26g, 26h, 26i, 26j, 26k, 26l are shown as a function of time on respective x-axes for the mother wavelet 25 shown in FIG. 3a. The FIGS. 3b-3m show different daughter wavelets, having different translations b and contractions/elongations a, said figures constituting four sets of figures, FIGS. 3b-3d; 3e-3g; 3h-3j; and 3k-3m.

For each set, the translation b is negative in the first FIG. 3b, 3e, 3h, 3k, zero in the second FIG. 3c, 3f, 3i, 3l and positive in the third FIG. 3d, 3g, 3j, 3m. For the first set of figures, the contraction/elongation a has the value 1.5, for the second set of figures, the contraction/elongation a has the value 1.0, for the third set of figures, the contraction/elongation a has the value 0.5 and for the fourth set of figures, the contraction/elongation a has the value −0.5. Notably, the daughter wavelet 26e in FIG. 3f equals the mother wavelet 25, since the contraction/elongation a equals 1.0 and the translation b equals zero. When the contraction/elongation a<1, then there is a contraction, and when the contraction/elongation a>1, there is an elongation.

When using wavelet functions in the present invention, the generated and transmitted signals consist of essentially orthogonal mother wavelets 25, and the received signals consist of daughter wavelets 26a, 26b, 26c, 26d, 26e, 26f, 26g, 26h, 26i, 26j, 26k, 26l, being translated in time and contracted or elongated. The translation in time, the delay, provides information regarding the distance to the reflection in question, and the contraction, which is in the form of elongation or contraction, provides information regarding in which direction and with which radial velocity the reflection is moving.

Here, radial velocity means velocity in the direction of a bisectrix of an angle between a receiving antenna and a transmitting antenna seen from the reflecting object 24.

An elongated daughter wavelet means that the reflected signal is reflected from an object that is moving away from the receiving antenna, where the amount of elongation corresponds to the radial velocity of the object, and a contracted daughter wavelet means that the reflected signal is reflected from an object that is moving towards the receiving antenna, where the amount of contraction corresponds to the radial velocity of the object.

Figure 4:
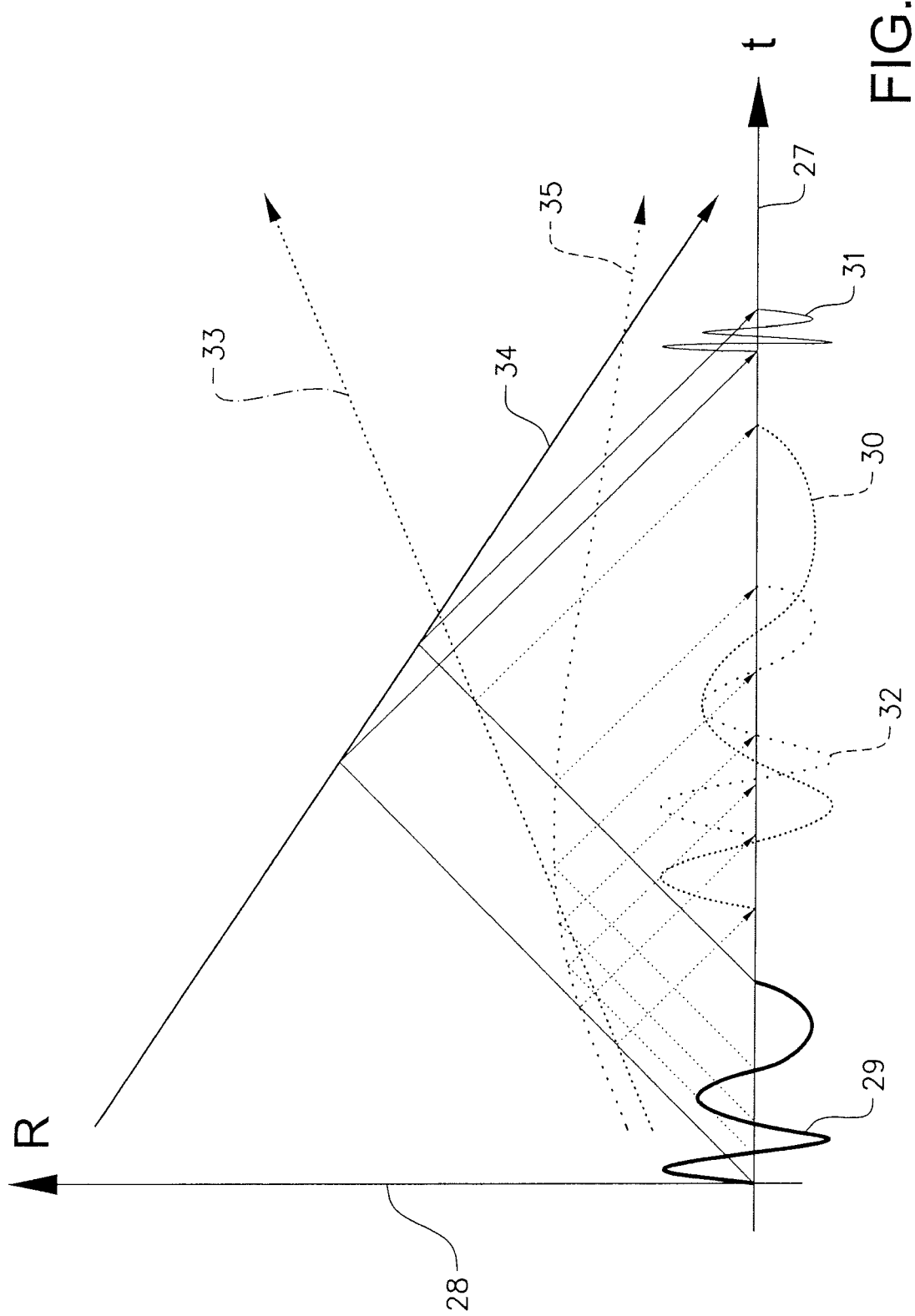
FIG. 4 shows a graphical diagram of range and time.

The above is illustrated in FIG. 4, where a graphical diagram of range and time is shown. On a horizontal axis 27, time t is represented. On a vertical axis 28, the range R to an object is represented, where said range R is normalized with the speed of light. A transmitted signal 29 here results in either a first received signal 30, a second received signal 31 or a third received signal 32 depending on the object that the transmitted signal 29 is reflected at.

The first received signal 30 is elongated, and relates to an outgoing object 33, represented with a movement arrow showing its direction, the object 33 having a constant radial velocity. In FIG. 4, the object's 33 movement arrow and the first received signal 30 are marked with a fine-dotted line. The second received signal 31 is compressed, and relates to an approaching object 34, represented with a movement arrow showing its direction, the object 34 having a constant radial velocity. In FIG. 4, the object's 34 movement arrow and the second received signal 31 are marked with a solid line. The third received signal 32 is partly elongated and partly compressed, and relates to an object 35, represented with a movement arrow showing its direction, that first is outgoing and then is approaching, the object 35 having a changing radial velocity. In FIG. 4, the object's 35 movement arrow and the second received signal 32 are marked with a dotted line.

Utilizing said wavelets means that the correlation receiver 22 is in the form of a wavelet receiver, where the computer 23 calculates the cross-wavelet transforms between linearly time shifted, or delayed, wavelet transforms of the received signal based on each mother wavelet, i.e. the transmitted signal. In most cases, each combination of time shifts corresponds to a unique direction. The correct time shifts for each direction are given by the geometry of the antenna configuration.

The received signal could alternatively, for each direction, be transformed to the wavelet domain with a mother wavelet that is a sum of correctly time shifted mother wavelets i.e. the transmitted signals.

The first method requires the least computational effort, and the second will supply the most accurate result in the real case where noise is added to the received signal. Both methods will result in a wavelet transform surface with delay and contraction/elongation axes. The delay position and the contraction/elongation position of the correlation peaks on the resulting surface will correspond to the range and radial velocity of each reflection. With both methods, the direction is given by the combination of linear time shifts that maximize each correlation peak.

Figure 5:
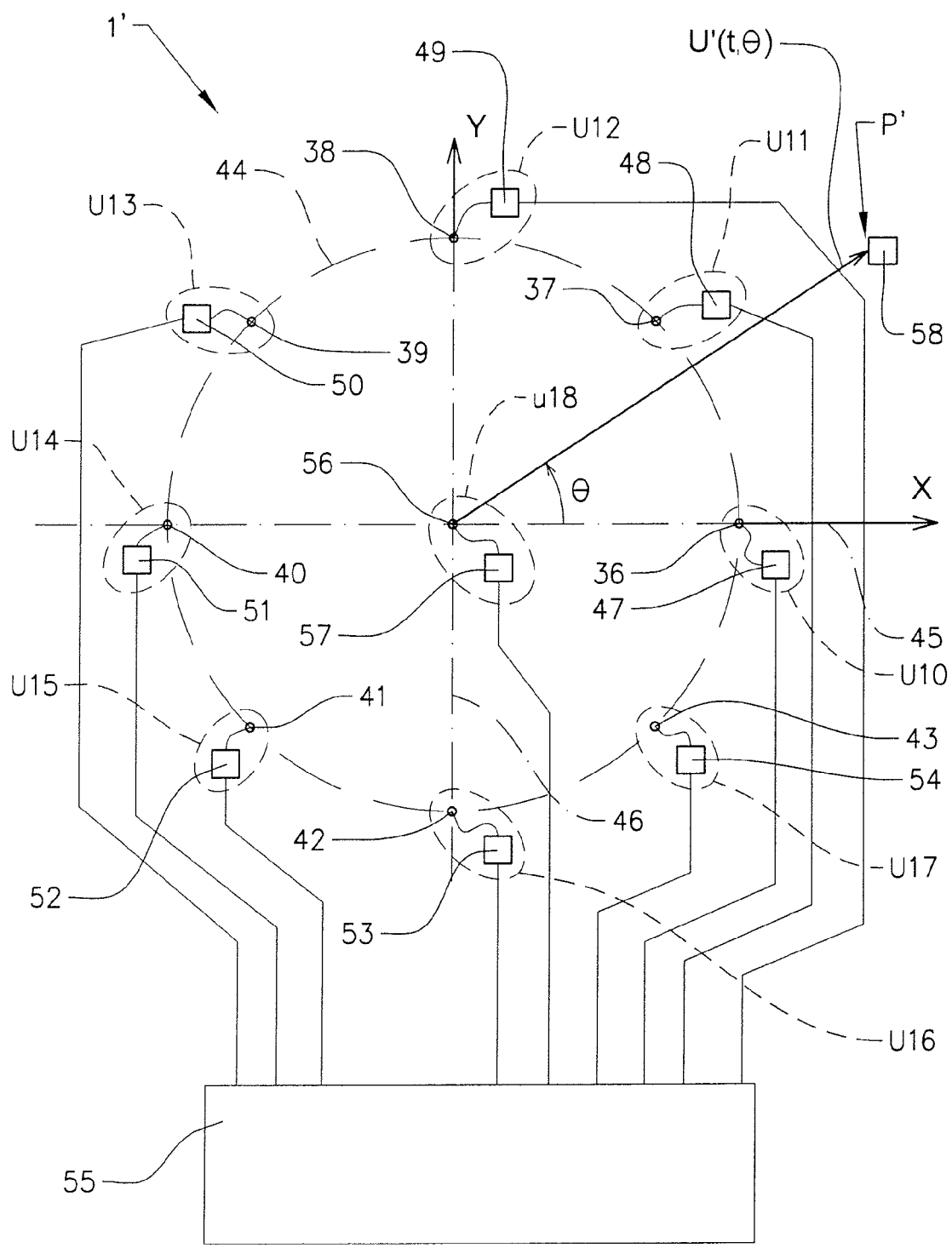
FIG. 5 shows a top view of a second embodiment.

According to a second embodiment of a radar system 1' according to the present invention, with reference to FIG. 5, a first receiving antenna 36, second receiving antenna 37, third receiving antenna 38, fourth receiving antenna 39, fifth receiving antenna 40, sixth receiving antenna 41, seventh receiving antenna 42, and eighth receiving antenna 43 are positioned essentially at the circumference of a circle 44 having a diameter D. For explanatory reasons, an x-axis 45, running through the first antenna 36 and the sixth antenna 40, and an y-axis 46, running through the third antenna 37 and the seventh antenna 42, are drawn in FIG. 1.

Each receiving antenna 36, 37, 38, 39, 40, 41, 42, 43 is connected to a corresponding receiver 47, 48, 49, 50, 51, 52, 53, 54. Each receiver 47, 48, 49, 50, 51, 52, 53, 54 is connected to a computer 55 for performing computations on the received signals.

Essentially in the middle of the circle, a transmitting antenna 56 is positioned, where the distance between the transmitting antenna 56 and each one of the receiving antennas 36, 37, 38, 39, 40, 41, 42, 43 essentially is the distance ½ D, i.e. the radius of the circle 44. The receiving antennas 36, 37, 38, 39, 40, 41, 42, 43 are positioned essentially equidistantly with respect to each other, several wavelengths apart, typically with a separation of 0.7·λ/desired beamwidth (in radians), where the wavelength λ corresponds to the centre frequency in the frequency band used.

The transmitting antenna 56 is connected to a signal generator 57, where the signal generator 57 also is connected to the computer 55.

Each antenna 36, 37, 38, 39, 40, 41, 42, 43, 56 and its corresponding receiver 47, 48, 49, 50, 51, 52, 53, 54, or signal generator 57, constitute an antenna unit U10, U11, U12, U13, U14, U15, U16, U17, U18. In particular, each receiving antenna 36, 37, 38, 39, 40, 41, 42, 43 and its corresponding receiver 47, 48, 49, 50, 51, 52, 53, 54 constitute a corresponding receiving antenna unit U10, U11, U12, U13, U14, U15, U16, U17, and the transmitting antenna 56 and its signal generator 57 constitute a transmitting antenna unit U18.

The transmitted signal may be white noise as described for the first embodiment. Generally, when using only one signal generator, the transmitted signal should be of a non-repetitive kind, where the signal should not be repetitive during a time which corresponds to the greatest distance at which detectable objects are present. Ideally, the transmitted signal in this case is a signal having an autocorrelation function that is defined by δ(t), i.e. a Dirac function which equals "1" (one) when the time equals zero, and which function equals zero for all other times. The transmitted signal is both radiated by the transmitting antenna 56 as well as fed to the computer 55.

At a certain point P', a second object 58 is positioned, reflecting the signal at that point P'. At this point P', at a certain time, the signal has a certain configuration. The reflected signal from the point P' has this certain configuration, and is received by the receiving antennas 36, 37, 38, 39, 40, 41, 42, 43. The received signals have different time delays, since they have been received at different positions due to the spatial separation of the receiving antennas 36, 37, 38, 39, 40, 41, 42, 43.

The different received signals are fed to the computer 55. The computer 55 performs a correlation procedure, comparing the received signals with a set of possible signal constellations, having different delayed and contracted/elongated copies of the transmitted signal, where only one certain signal delay and contraction or elongation corresponds to the reflected one. In other words, only one delayed and contracted or elongated copy corresponds to the reflected signal. The set of possible signal configurations is calculated using the generated signal as input. This type of receivers is also of the type correlation receiver.

In FIG. 5, a certain transmitted signal u'(t, θ) is indicated with an arrow. Said signal u'(t, θ) is dependent on time t and an azimuth angle θ between a certain azimuth line, in this example the x-axis, and the direction of the signal.

Mathematical expressions corresponding to the mathematical equations (1)-(9) above are also valid for the second embodiment, but will not be described more in detail here.

Preferably, wavelet functions of the same type as described for the first embodiment are used in an analogous manner in the second embodiment.

The present invention is not limited to the embodiments described above, but may vary freely within the scope of the appended claims. For example, any other antenna configuration is conceivable within the scope of the invention.

For the first embodiment, the transmitting antennas may be of any number, but at least two spatially separated transmitting antennas are necessary. When only two transmitting antennas are used, it is not possible to determine on which side of a line, passing through these two transmitting antennas, the reflection comes from. The same is valid for any number of transmitting antennas mounted on a line, forming a linear array, as described previously with reference to equations (8) and (9). However, when mounted to a wall or a hull, there is only one possible side, since the other side is blocked by said wall or hull.

However, if not mounted to a wall, hull, or similar, the transmitting antennas, if more than two, should not be positioned on a straight line in order to avoid ambiguities. The transmitting antennas should furthermore be positioned several wavelengths apart, typically much greater than the wavelength, where the wavelength corresponds to the centre frequency in the frequency band used.

For the second embodiment, the receiving antennas may be of any number, but at least two spatially separated receiving antennas are necessary. When only two receiving antennas are used, it is not possible to determine on which side of a line, passing through these two receiving antennas, the reflection comes from. However, when mounted to a wall or a hull, there is only one possible side, since the other side is blocked by said wall or hull. Furthermore, the receiving antennas, if more than two, should not be positioned on a straight line in order to avoid ambiguities and should be positioned several wavelength apart, typically much greater than the wavelength, where the wavelength corresponds to the centre frequency in the frequency band used.

For a general system according to the present invention, for at least one antenna 2, 3, 4, 5, 6, 7, 8, 9, 21; 36, 37, 38, 39, 40, 41, 42, 43, 56, one receiver and one signal generator may be connected to the same antenna, which then functions as both a transmitting antenna and a receiving antenna. In other words, at least one antenna unit U1, U2, U3, U4, U5, U6, U7, U8, U9; U10, U11, U12, U13, U14, U15, U16, U17, U18 may comprise both a signal generator 13, 14, 15, 16, 17, 18, 19, 20; 57 and a receiver 22; 47, 48, 49, 50, 51, 52, 53, 54 connected to an antenna 2, 3, 4, 5, 6, 7, 8, 9, 21; 36, 37, 38, 39, 40, 41, 42, 43, 56, the antenna unit U1, U2, U3, U4, U5, U6, U7, U8, U9; U10, U11, U12, U13, U14, U15, U16, U17, U18 thus constituting both a transmitting and a receiving antenna unit. In order to separate the transmitted and received signals, said signal generator 13, 14, 15, 16, 17, 18, 19, 20; 57 and said receiver 22; 47, 48, 49, 50, 51, 52, 53, 54 are connected to said antenna 2, 3, 4, 5, 6, 7, 8, 9, 21; 36, 37, 38, 39, 40, 41, 42, 43, 56 via a duplexing device (not shown) such as for example a circulator, or a switch. A switch is used when pulsed signals are used.

Then, the least number of antennas necessary for a general system according to the present invention are two, where one of the antennas then both has a transmitting functionality and a receiving functionality, thus constituting both a transmitting and a receiving antenna.

Any general combinations of the first and second embodiment with N receivers and M signal generators are of course possible, where $N \geq 1$, $M \geq 1$ and $N+M \geq 3$.

For all embodiments, wire antennas have been suggested. Any other types of antennas are of course conceivable, as long as at least two of them have a non negligible gain in each volume of interest, for example slot, horn and patch antennas. Furthermore, an antenna as referred to in this description, may in reality comprise more than one antenna element, and may thus constitute an array antenna.

The antennas used in a radar system 1, 1' according to the invention may be positioned in three dimensions instead of two dimensions as in the embodiment examples.

Furthermore, the shown receivers and signal generators may be integrated in one or more units, and the computer may be integrated in such a unit or separate.

Of course, radar systems 1, 1' according to the present invention may be used to detect a plurality of objects via a plurality of reflections.

Coloured noise, with non-equal power density over the used frequency band, is also possible even though it does not take full advantage of the frequency band used. It is even possible to have zeros, with zero power density, within a used frequency band, if radiation is not allowed at specific frequencies.

Where noise is discussed, it is assumed that it is not ideal in reality, but has a certain bandwidth. Where a wavelength for noise is discussed, the wavelength corresponds to the centre frequency in the frequency band that is used in reality.

The computer 23, 55 may comprise one physical computer, or several, more or less connected to each other. The computer or computers may be in the form of a microcomputer. The computer 23, 55 may generally be any type of processing unit. The processing unit 23, 55 may further, for example, be realized using optical technology or a combination of analogue and digital signal processing units. The means by which the results obtained from the processing unit 23, 55 are achieved, irrespective of which technology that is used for the processing unit 23, 55, is generally referred to as calculation.

What is claimed is:
1. A radar system, comprising:
    at least two spatially separated antenna units, wherein each antenna unit has one antenna, wherein at least two of the antenna units each has a signal generator coupled to an antenna so as to constitute transmitting antenna units and wherein at least one of the antenna units has a receiver coupled to an antenna so as to constitute at least one receiving antenna unit, the receiving antenna unit being arranged for receiving at least one reflected signal, being signals generated by said signal generators and transmitted by the transmitting antenna units, having been reflected from at least one object;

a processing unit;

a means for coupling the transmitting antenna units and the receiving antenna unit to the processing unit;

the processing unit being arranged to perform a correlation calculation, comparing at least one received signal, fed from said receiving antenna unit with a set of superimposed combinations of delayed and contracted or elongated copies of the signals generated by said signal generators, where only one certain combination corresponds to said reflected signal, the processing unit being further arranged to calculate said set of combinations with the signals generated by said signal generators as input, and where information about said object is calculated using said corresponding combination for each reflected signal.

2. The radar system according to claim 1, wherein the at least one antenna unit comprises both a signal generator and a receiver coupled to an antenna via a duplexing device, the antenna unit thus constituting both a transmitting and a receiving antenna unit.

3. The radar system according to claim 1, further comprising at least two transmitting antenna units, and at least one receiving antenna unit being separate from said two transmitting antenna units.

4. The radar system according to claim 3, wherein the antennas which are comprised in said transmitting antenna units are placed essentially on the circumference of a circle.

5. The radar system according to claim 1, wherein the signal generators generate signals which are essentially mutually uncorrelated.

6. A radar system, comprising:

at least two antenna units wherein each antenna unit comprises one antenna, wherein at least two of the antenna units comprise a receiver coupled to an antenna so as to constitute receiving antenna units and wherein at least one of the antenna units has a signal generator coupled to an antenna so as to constitute a transmitting antenna unit, said at least two receiving antenna units being arranged for receiving at least one reflected signal, having at least one signal generated by said signal generator and transmitted by said transmitting antenna unit, having been reflected from at least one object;

a processor unit;

means for coupling said receiving antenna units and said transmitting antenna unit to the processing unit;

the processing unit arranged to perform a correlation calculation, comparing the signals fed from the receiving antenna units with a set of delayed and contracted or elongated copies of said signal generated by said signal generator, where only one delayed and contracted or elongated copy corresponds to said reflected signal, where the processing unit is arranged to calculate the set of delayed and contracted or elongated copies with said signal generated by said signal generator as input, and where information about the at least one object is calculated using said corresponding delayed and contracted or elongated copy for each reflected signal.

7. The radar system according to claim 6, wherein the at least one antenna unit comprises both a signal generator and a receiver coupled to an antenna via a duplexing device, the antenna unit thus constituting both a transmitting and a receiving antenna unit.

8. The radar system according to claim 6, further comprising at least two receiving antenna units and at least one transmitting antenna unit, being separate from said receiving antenna units.

9. The radar system according to claim 8, wherein the antennas which are comprised in said receiving antenna units are placed essentially on the circumference of a circle.

10. The radar system according to claim 6, wherein said signal generator generates a signal which is essentially non-repetitive.

11. The radar system according to claim 6 wherein the calculated information about said object comprises distance, and/or radial velocity, and/or azimuth bearing.

12. The radar system according to claim 6, wherein the antennas are essentially omni-directional.

13. The radar system according to claim 6, wherein each generated and transmitted signal is in the form of a wavelet function, and wherein each generated and transmitted signal consists of mother wavelets.

14. The radar system according to claim 13, wherein each receiver is in the form of a wavelet receiver and wherein the processing unit is arranged to calculate the correlation between wavelet transforms.

15. A method for determining at least one of distance, radial velocity and azimuth bearing, to at least one object using a radar system, the method comprising the steps of:

generating and transmitting at least two signals, which signals essentially are mutually uncorrelated, using at least two corresponding transmitting antennas with a certain spatial separation;

feeding said at least two generated signals to a processing unit;

receiving at least one signal, reflected from said object, using at least one receiving antenna;

feeding said received signal to the processing unit;

performing a correlation calculation for the generated and received signals fed to the processing unit;

determining at least one of: distance, radial velocity and azimuth bearing to said object, using the result from the correlation calculation;

performing the correlation calculation by comparing said received signal with a set of superimposed combinations of delayed and contracted or elongated copies of the generated signals; and calculating the set of possible signal combinations with the generated signals as input, where only one certain signal combination corresponds to said reflected signal.

16. A method for determining at least one of: distance, radial velocity and azimuth bearing, to at least one object using a radar system, the method comprising the steps of:

generating and transmitting at least one essentially non-repetitive signal using at least one corresponding transmitting antenna;

feeding said generated signal to a processing unit;

receiving at least one signal reflected from said object using at least two receiving antennas having a certain spatial separation, resulting in two received signals;

feeding said received signals to the processing unit;

performing a correlation calculation for the generated and received signals fed to the processing unit;

determining at least one of: distance, radial velocity and azimuth bearing to said object, using the result from the correlation calculation;

performing the correlation calculation by comparing said received signals with a set of delayed and contracted or elongated copies of said generated signal; and calculating the set of signal copies using said generated signal as input, where only one copy corresponds to said reflected signal.

17. A method for determining at least one of distance, radial velocity and azimuth bearing, to at least one object using a radar system, the method comprising the steps of:

generating and transmitting at least two signals, which signals essentially are mutually uncorrelated, using at least two corresponding transmitting antennas with a certain spatial separation;

feeding said at least two generated signals to a processing unit;

receiving at least one signal, reflected from said object, using at least one receiving antenna;

feeding said received signal to the processing unit;

performing a correlation calculation for the generated and received signals fed to the processing unit; and determining at least one of: distance, radial velocity and azimuth bearing to said object, using the result from the correlation calculation, wherein each generated and transmitted signal is in the form of a wavelet function, where each generated and transmitted signal consists of mother wavelets and further wherein the delay is used to provide information regarding the distance to a certain reflection, and elongation or contraction is used to provide information regarding in which direction and with which radial velocity the reflection is moving and wherein the cross wavelet transforms between delayed wavelet transforms of the received signal are calculated based on each mother wavelet, each combination of delays corresponding to a unique direction, where the correct delays for each direction is given by the geometry of the antenna configuration.

18. A method for determining at least one of: distance, radial velocity and azimuth bearing, to at least one object using a radar system, the method comprising the steps of:

generating and transmitting at least one essentially non-repetitive signal using at least one corresponding transmitting antenna;

feeding said generated signal to a processing unit;

receiving at least one signal reflected from said object using at least two receiving antennas having a certain spatial separation, resulting in two received signals;

feeding said received signals to the processing unit;

performing a correlation calculation for the generated and received signals fed to the processing unit; and determining at least one of: distance, radial velocity and azimuth bearing to said object, using the result from the correlation calculation, wherein each generated and transmitted signal is in the form of a wavelet function, where each generated and transmitted signal consists of mother wavelets, and wherein the delay is used to provide information regarding the distance to a certain reflection, and elongation or contraction is used to provide information regarding in which direction and with which radial velocity the reflection is moving and wherein the received signal is transformed to the wavelet domain for each direction, by means of a mother wavelet that is a sum of correctly delayed mother wavelets.

19. A method for determining at least one of distance, radial velocity and azimuth bearing, to at least one object using a radar system, the method comprising the steps of:

generating and transmitting at least two signals, which signals essentially are mutually uncorrelated, using at least two corresponding transmitting antennas with a certain spatial separation;

feeding said at least two generated signals to a processing unit;

receiving at least one signal, reflected from said object, using at least one receiving antenna;

feeding said received signal to the processing unit;

performing a correlation calculation for the generated and received signals fed to the processing unit; and determining at least one of: distance, radial velocity and azimuth bearing to said object, using the result from the correlation calculation, wherein each generated and transmitted signal is in the form of a wavelet function, where each generated and transmitted signal consists of mother wavelets and wherein the delay is used to provide information regarding the distance to a certain reflection, and elongation or contraction is used to provide information regarding in which direction and with which radial velocity the reflection is moving and wherein the cross wavelet transforms between delayed wavelet transforms of the received signal are calculated based on each mother wavelet, each combination of delays corresponding to a unique direction, where the correct delays for each direction is given by the geometry of the antenna configuration.

20. A method for determining at least one of distance, radial velocity and azimuth bearing, to at least one object using a radar system, the method comprising the steps of:

generating and transmitting at least two signals, which signals essentially are mutually uncorrelated, using at least two corresponding transmitting antennas with a certain spatial separation;

feeding said at least two generated signals to a processing unit;

receiving at least one signal, reflected from said object, using at least one receiving antenna;

feeding said received signal to the processing unit;

performing a correlation calculation for the generated and received signals fed to the processing unit; and determining at least one of: distance, radial velocity and azimuth bearing to said object, using the result from the correlation calculation, wherein each generated and transmitted signal is in the form of a wavelet function, where each generated and transmitted signal consists of mother wavelets and wherein the delay is used to provide information regarding the distance to a certain reflection, and elongation or contraction is used to provide information regarding in which direction and with which radial velocity the reflection is moving and wherein the received signal is transformed to the wavelet domain for each direction, by means of a mother wavelet that is a sum of correctly delayed mother wavelets.

* * * * *